(12) United States Patent
Cascario et al.

(10) Patent No.: US 8,215,394 B2
(45) Date of Patent: Jul. 10, 2012

(54) CONTROL LINE PATCH

(75) Inventors: Dario Cascario, Pescara (IT); Steve Rosenblatt, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 335 days.

(21) Appl. No.: 12/481,171

(22) Filed: Jun. 9, 2009

(65) Prior Publication Data
US 2010/0307748 A1    Dec. 9, 2010

(51) Int. Cl.
*E21B 33/12* (2006.01)
(52) U.S. Cl. .................. 166/277; 166/387; 166/191
(58) Field of Classification Search .................. 166/277, 166/302, 387, 183, 191, 206, 207, 212, 288, 166/57, 318, 192
See application file for complete search history.

(56) References Cited

U.S. PATENT DOCUMENTS

| | | | |
|---|---|---|---|
| 3,385,367 A * | 5/1968 | Kollsman | 166/191 |
| 3,780,802 A | 12/1973 | Phipps et al. | |
| 3,806,168 A | 4/1974 | McGee et al. | |
| 3,844,345 A | 10/1974 | Evans et al. | |
| 4,262,703 A | 4/1981 | Moore et al. | |
| 5,479,986 A * | 1/1996 | Gano et al. | 166/292 |
| 5,829,524 A * | 11/1998 | Flanders et al. | 166/277 |
| 6,775,894 B2 * | 8/2004 | Hardin | 29/402.09 |
| 7,086,476 B2 * | 8/2006 | Johnson et al. | 166/380 |
| 7,401,647 B2 | 7/2008 | Baycroft et al. | |
| 7,422,068 B2 | 9/2008 | Lynde | |
| 7,543,639 B2 | 6/2009 | Emerson | |
| 7,562,714 B2 | 7/2009 | Lynde | |
| 7,861,775 B2 | 1/2011 | Palmer et al. | |
| 2005/0241824 A1 * | 11/2005 | Burris et al. | 166/255.1 |
| 2010/0155085 A1 * | 6/2010 | Spencer | 166/386 |

OTHER PUBLICATIONS

Wright, Jon C., et al.; "Expandable Tubular Casing Repairs: Four Case Histories"; SPE 84049; Oct. 2003; 1-10.
Filippov, Andrei, et al.; "Expandable Tubular Solutions"; SPE 56500; Oct. 1999; 1-16.
Perez-Roca, Eduardo; "Optimizing Producing Wells with Solid Expandable Tubular Technology"; SPE 107932; Apr. 2007; 1-7.

\* cited by examiner

*Primary Examiner* — Shane Bomar
*Assistant Examiner* — Catherine Loikith
(74) *Attorney, Agent, or Firm* — Steve Rosenblatt

(57) ABSTRACT

A control or other line with a hole downhole can be repaired by pumping a device that is driven by pressure delivered behind a leading seal. The device advances until the leading seal passes the opening in the line where its forward movement is stopped. Upstream of the opening a fluid activated seal is energized so that seals now straddle the opening in the wall. A passage that extends between the seals is opened by blowing a rupture disc with internal pressure to once again give access to the downhole tool through the passage that has external seals to straddle the hole in the tubing wall. Normal operation of the downhole tool can then resume.

20 Claims, 3 Drawing Sheets

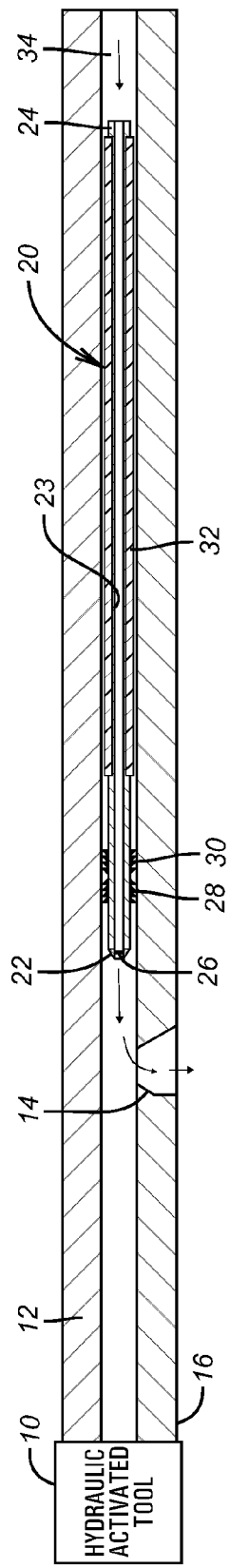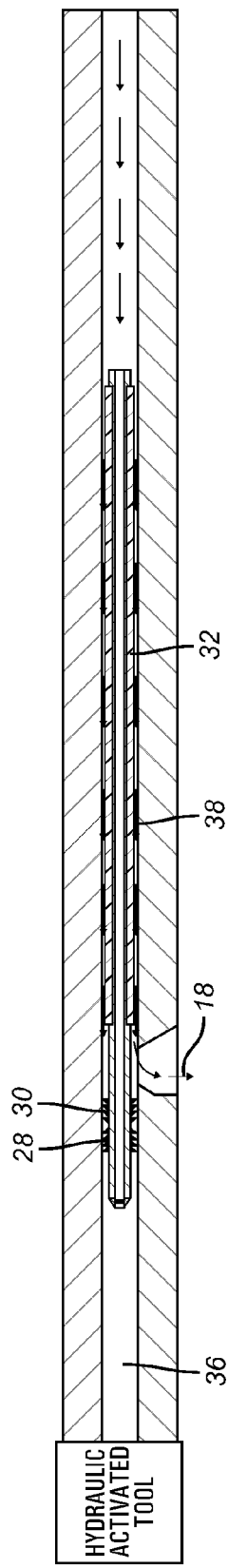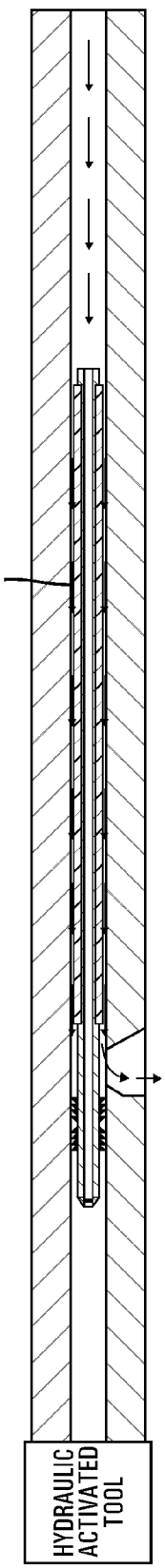

CONTROL LINE PATCH

FIELD OF THE INVENTION

The field of the invention is repair devices and methods for damaged tubulars downhole and more specifically control lines that conduct pressurized fluid to a variety of downhole tools.

BACKGROUND OF THE INVENTION

Bottom hole assemblies can use a variety of tools downhole that are surface controlled through hydraulic control lines that run along a tubing string from the surface at one end to the downhole tool at the other end. Safety valves and isolation valve are just some examples. Frequently these lines are run in bundles with different termination points and into wellbores that are not necessarily vertical. These lines have to get past packers in some applications. Generally the lines are secured to the exterior of the tubing string as the joints are added at the surface. Since these lines go through close clearances such as a tubing string moving through a cased and cemented wellbore, there are opportunities for such lines to become damages in various ways. One of the worst ways that such damage can occur is that a hole develops in a control line. Depending on the size of the hole and the resulting ability of the control line to convey the required pressure to the downhole tool, the presence of a hole in a control line can result in the downhole tool being inoperative from the surface. When this happens the string has to be pulled so that the location of the damage can be determined and repaired. This causes significant downtime that can be very costly to the well operator.

In the past efforts were directed to protect control lines run into wellbores by encapsulating them or using other protective devices. A few representative examples are U.S. Pat. Nos. 4,262,703; 3,844,345; 3,806,168 and 3,780,802.

The present invention provides a method and associated equipment to locate the line break and straddle it while providing sealing on opposed ends of the break whereupon normal pressurized flow can be resumed by opening a passage through the device that straddled the break. The equipment may have limits to certain situations and may not be optimally suitable for other situations. One limiting condition may be a complete control line break or situations where the line is crimped or bent so badly as to impede movement of the repair device through it. However, options are available for unique situations. For example, the crimps in the line can be taken out with a tool that is pumped down the control line to the point of the hole in the wall and then retrieved so as to take the kinks out of the line to a sufficient extend that the repair device will travel to the hole location. Alternatively the repair device can be configured with a leading swage 50 shown in FIG. 6 to return the internal dimension of the control line to the original dimension as the repair device is advanced to the hole location.

In one aspect of the device, the wall hole is straddled with seals before and after and the seal that is uphole of hole energized to close leaving a straddle tube sealed on opposed ends that only needs communication through it to be opened up so that normal control line operations can resume.

In another option, a light source and camera can be first run into the control line to determine the hole location or locations as a preliminary indication of whether a repair is even feasible.

These and other details of the method and associated apparatus for repair of control or other types of lines in a downhole environment will be more readily understood by those skilled in the art from a review of the description of the preferred embodiment and the associated drawings while understanding that the full scope of the invention is to be found in the appended claims.

SUMMARY OF THE INVENTION

A control or other line with a hole downhole can be repaired by pumping a device that is driven by pressure delivered behind a leading seal. The device advances until the leading seal passes the opening in the line where its forward movement is stopped. Upstream of the opening a fluid activated seal is energized so that seals now straddle the opening in the wall. A passage that extends between the seals is opened by blowing a rupture disc with internal pressure to once again give access to the downhole tool through the passage that has external seals to straddle the hole in the tubing wall. Normal operation of the downhole tool can then resume.

BRIEF DESCRIPTION OF THE DRAWINGS

FIG. 1 shows the repair tool advancing to the break in the control line;

FIG. 2 is the view of FIG. 1 with the leading seal of the repair tool advanced beyond the control line wall opening;

FIG. 3 is the view of FIG. 2 with activating fluid being pumped to energize the seal on the uphole end of the break in the control line;

DETAILED DESCRIPTION OF THE PREFERRED EMBODIMENT

FIG. 1 shows a hydraulically operated downhole tool 10 that is surface operated with a control line 12 that has been damaged as indicated by a hole 14. Typically the control line 12 is secured to a tubular 16 that runs from the well surface to the downhole tool 10 using one or more connected strings. Arrows 18 represent flow out the hole 14 as the repair tool 20 is advanced in the control line 12.

Figure 6:
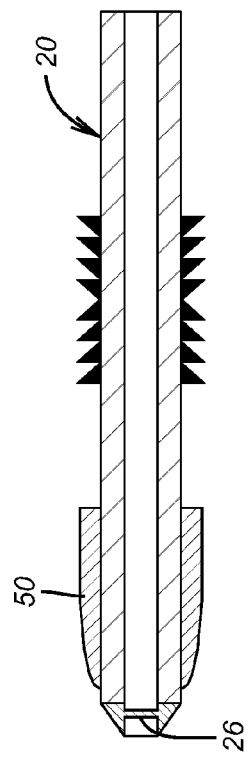
FIG. 6 is a close up of a leading end of the tool showing one placement of the swage.

The repair tool 20 has a downhole or leading end 22 and a trailing end 24. The structure is basically a tubular body 23 that is preferably closed at leading end 22 with a breakable member such as a rupture disc 26 that is illustrated schematically. As an option there can be a small conical swage either ahead of the schematically illustrated rupture disc 26 or the swage 50 can also be on the exterior wall of the tubular body 23 as shown in FIG. 6. Opposed seals 28 and 30 are mounted on the exterior of the tubular body 23 with seals 28 retaining pressure going uphole toward end 24 and seal 30 retaining pressure in the downhole direction toward end 22.

Figure 4:
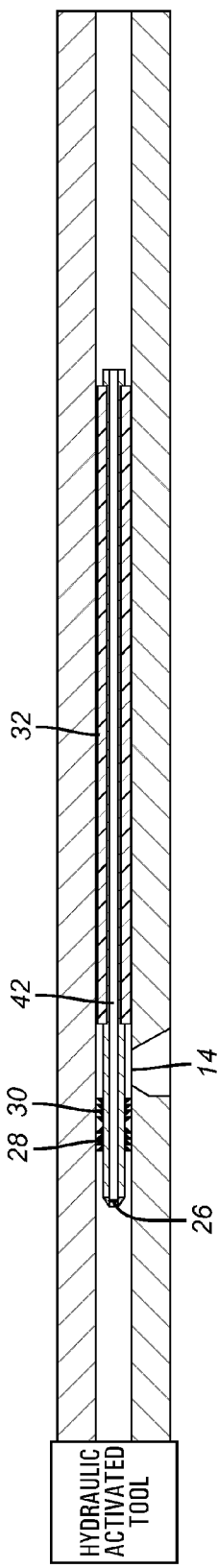
FIG. 4 is the view of FIG. 3 with seals now in place on either side of the wall opening while the through passage is still obstructed.

Located externally to the tubular housing 23 and spaced uphole from seal 30 is a reactive seal 32 that is run in at a smaller dimension and gets larger when exposed to fluid like water to enlarge and seal the annular space outside the housing 23 and within the control line 12. For example the seal 32 can be water reactive clay like bentonite or montmorillonite. Alternatively the seal 32 can react with oil or other hydraulic fluids. It should be noted that to avoid early actuation of the seal 32 the control line 12 can be flushed into opening 14 with fluid that is not reactive with seal 32 and then, once the seal 32 is in position, the fluid can be changed to induce the seal to enlarge and close off the annular space around the housing 23, as is shown in FIG. 4.

Referring to FIG. 1 the tool 20 is advanced into the control line 12 until the seals 28 and 30 have moved past the hole 14. Since the leading end 22 is closed, the tool 20 can be delivered with surface pressure applied into the control line 12 at the surface end indicated schematically as 34. If the seal 32 is water reactive than it is preferred to use hydraulic oil behind the tool 20 to drive it toward the hole 14. As mentioned before, it is possible to drive a swage with the tool 20 to try to get any smaller kinks or dents in the control line 12 to go back to round so as to assist the tool 20 in its advancement to the FIG. 2 position.

As shown in FIG. 2 the seals 28 and 30 have gone past the hole 14. Since there is no outlet from zone 36 in the control line 12, once the seals 28 and 30 get past the hole 14 forward progress of the tool 20 comes to a halt. Since there is oil in the control line 12 the seal 32 that is still uphole of the hole 14 has not been energized and there is an annular flow passage represented by arrows 38 that allows the oil pumped from the surface 34 to go around the housing 23 and into the hole 14. Surface personnel will sense that the housing 23 is no longer advancing despite the flow of oil into the control line 12. They will also notice a distinct change in the flow rate once the seals 28 and 30 go past the hole 14. Since seal friction at seals 28 and 30 will be reduced because those seals no longer move the flow now going into the hole 14 is likely to increase and the surface pressure may drop depending on previous flow conditions used to advance the tool 20 into the control line 12.

At that point the fluid is changed to admit fluid that will energize the seal 32 now in position above the hole 14. This is shown in FIG. 3 as the seal 32 if it is clay is energized by pumped water from the surface 34 as indicated by arrows 40. The seal 32 can instead be a water reactive polymer as yet another option for the seal energized downhole. Eventually, the seal 32 swells and gets hard to close off the annular space around the housing 23 as shown in FIG. 4 by the disappearance of the arrows 40. The hole 14 is now straddled by seals 28 and 30 on the downhole side of hole 14 and activated seal 32 on the uphole side of hole 14. The through passage 42 is still sealed as the rupture disc 26 is still intact.

Figure 5:
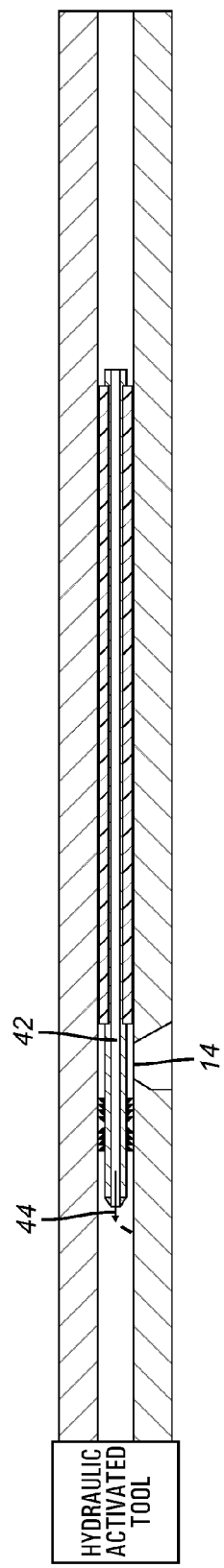
FIG. 5 is the view of FIG. 4 with the through passage opened for flow so that the control line can be put back in service to actuate a downhole tool.

Arrow 44 in FIG. 5 indicates that the passage 42 has been opened up either with pressure or some other way to make the rupture disc or end plug go away such as for example by dissolving it. Passage 42 now spans the hole 14 and is open to zone 36 that goes to the downhole tool 10. The hole 14 is sealed by virtue of seals 28 and 30 on the downhole side and seal 32 on the uphole side. Pressure applied at surface 34 will now reach the tool 10 without leaks as indicated by arrow 44.

Figure 7:
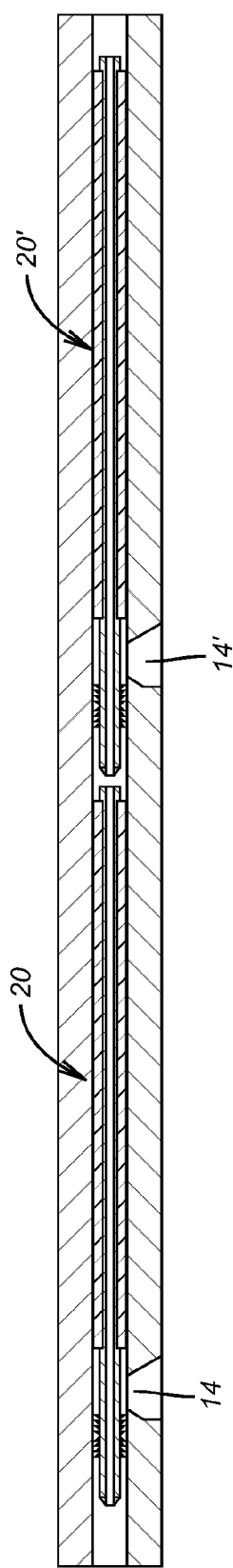
FIG. 7 shows the use of multiple tools to straddle spaced apart openings in a control line.

If the tool 20 gets stuck before reaching the hole 14 then the passage 42 can just be opened by blowing the rupture disc 26. If there are several holes 14 in a single line 12 then the tool 20 can be propelled to the furthest hole 14 away from the surface 34 and in series each hole 14 can be straddled in succession. FIG. 7 shows a first assembly that is already straddling an unseen opening further downstream and a second tool 20' delivered behind it to straddle another opening 14'. If a leading swage is used then it needs a passage through it that can be opened when the tool 20 is in position straddling a hole 14.

While seal 32 is shown offset from the hole 14 it can also optionally overlay the hole 14 before it is activated. The tubular housing 23 can be made of a variety of flexible materials such as plastic or malleable metals.

Figure 8:
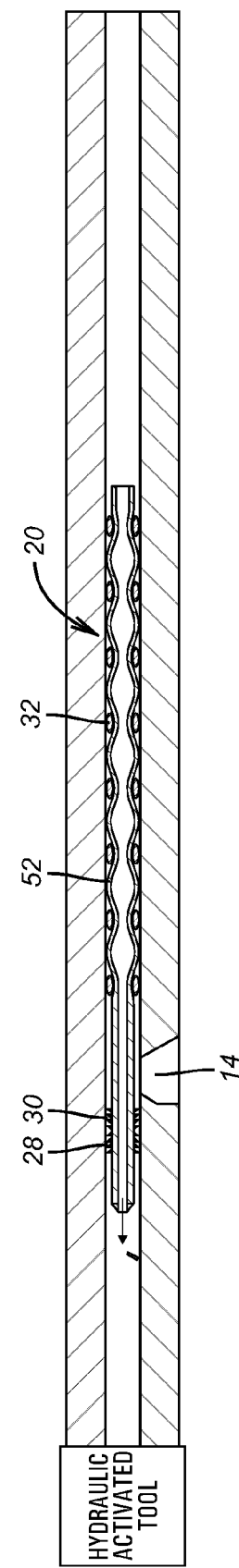
FIG. 8 shows a version of the tool with an initial corrugated body using a shape memory alloy that goes to round when warmed above its transition temperature.

As an alternative, the tool 20 can be made of a shape memory material such as an alloy and delivered into the control line in a round or a corrugated cross section 52, as shown in FIG. 8. The corrugations can be along an axis perpendicular to the axis of tool 20, as shown, or extending axially along the tool 20. External seals such as 28, 30 or/and 32, as shown in FIG. 8, may be used or omitted. Once it is known that the tool 20 is straddling the hole 14 heat can be applied with a heater that is retrievable to the surface or the heat from the well fluids can cause a state change in the shape memory material so that it goes to a larger shape and seals the hole 14 with or without external seals. Once such a design is over a hole 14 and heat is applied by circulating fluid through the control line 12, surface personnel will note that flow has dropped off as the dimension of the tool has increased to the point where flow around the outside of the tool is no longer possible due to the material having gone past its transition temperature.

The above description is illustrative of the preferred embodiment and many modifications may be made by those skilled in the art without departing from the invention whose scope is to be determined from the literal and equivalent scope of the claims below:

We claim:

1. A method of repair from a surface location of a wall of a tubular line located in a subterranean location, comprising:
    delivering a tubularly-shaped patch through the tubular line using fluid flow;
    positioning said patch over at least one wall opening in said line;
    sealing said opening with said patch;
    delivering pressurized fluid from the surface through said patch and within said line to a location beyond said opening.

2. The method of claim 1, comprising:
    using a tubularly shaped patch that changes dimensions;
    actuating said patch to change dimensions downhole to close said opening.

3. The method of claim 2, comprising:
    using a shape memory alloy material for said patch.

4. The method of claim 3, comprising:
    providing heat to make said shape memory alloy cross a transition temperature when said patch is over said opening.

5. The method of claim 4, comprising:
    using heat from a heater delivered with said patch or from surrounding well fluids to place said patch in a sealing relationship with the tubular line.

6. The method of claim 1, comprising:
    delivering a plurality of patches into said tubular line to sequentially patch more than one opening.

7. The method of claim 1, comprising:
    using said tubular line as a control line to a downhole tool to operate said tool from above the subterranean location.

8. A method of repair of a tubular line located in a subterranean location, comprising:
    delivering a patch through the tubular line using fluid flow;
    positioning said patch over at least one opening in said line;
    sealing said patch to a wall of said line;
    delivering pressurized fluid through said patch and within said line to a location beyond said opening;

using fluid in said line located beyond said opening as a fluid brake to further progress of said patch.

9. A method of repair of a tubular line located in a subterranean location, comprising:
delivering a patch through the tubular line using fluid flow;
positioning said patch over at least one opening in said line;
sealing said patch to a wall of said line;
delivering pressurized fluid from the surface through said patch and within said line to a location beyond said opening;
providing at least one external seal on said patch that leaves a clearance in said tubular line during said delivering;
actuating said external seal to sealingly contact the tubular line when said patch is over said opening.

10. A method of repair of a tubular line located in a subterranean location, comprising:
delivering a patch through the tubular line using fluid flow;
positioning said patch over at least one opening in said line;
sealing said patch to a wall of said line;
delivering pressurized fluid through said patch and within said line to a location beyond said opening;
providing a swage on said patch;
returning the tubular line to a round shape with said swage taking out bends or kinks in said tubular line.

11. The method of claim 10, comprising:
mounting said swage on a leading end of said patch;
providing a selectively opened passage on said swage.

12. The method of claim 10, comprising:
locating a swage on an exterior of a tubularly shaped patch.

13. A method of repair of a tubular line located in a subterranean location, comprising:
delivering a patch through the tubular line using fluid flow;
positioning said patch over at least one opening in said line;
sealing said patch to a wall of said line;
delivering pressurized fluid through said patch and within said line to a location beyond said opening;
making said patch a tubular shape with a selectively blocked passage therethrough;
opening said passage when said patch is over said opening in the tubular line and sealed thereto.

14. The method of claim 13, comprising:
using a rupture disc that opens said passage.

15. A method of repair from a surface location of a wall of a tubular line located in a subterranean location, comprising:
delivering a patch through the tubular line using fluid flow;
positioning said patch over at least one opening in said line;
sealing said opening with patch;
delivering pressurized fluid from the surface through said patch and within said line to a location beyond said opening;
providing spaced seals on a tubularly shaped patch;
straddling said opening with said spaced seals;
actuating one of said spaced seals into sealing contact with the tubular line after said straddling.

16. The method of claim 15, comprising:
actuating one of said spaced seals into said sealing contact with a fluid delivered through said tubular line and into said opening;
closing a fluid path around said patch when said fluid activates said seal into contact with the tubular line.

17. The method of claim 16, comprising:
using water swelling clay or a water reactive polymer as said seal that is uphole of the opening;
pumping water to actuate said clay seal to sealingly engage the tubular line.

18. The method of claim 15, comprising:
actuating said seal that is uphole of said opening to swell to seal against the tubular line.

19. The method of claim 18, comprising:
providing a pair of seals that are located beyond said opening where such seals have opposite orientations to seal against pressure differentials in opposed directions.

20. A method of repair of a tubular line located in a subterranean location, comprising:
delivering a patch through the tubular line using fluid flow;
positioning said patch over at least one opening in said line;
sealing said patch to a wall of said line;
delivering pressurized fluid through said patch and within said line to a location beyond said opening;
using a tubularly shaped patch that changes dimensions;
actuating said patch to change dimensions downhole to close said opening;
using a shape memory alloy material for said patch;
providing heat to make said shape memory alloy cross a transition temperature when said patch is over said opening;
using heat from a heater delivered with said patch or from surrounding well fluids to place said patch in a sealing relationship with the tubular line;
reducing the run in dimension of said shape memory alloy before running the patch into the tubular line;
converting said run in dimension to a rounded shape at said opening.

* * * * *